(12) United States Patent
Hickenbottom et al.

(10) Patent No.: US 11,339,062 B2
(45) Date of Patent: May 24, 2022

(54) METHODS FOR SUSTAINABLE MEMBRANE DISTILLATION CONCENTRATION OF HYPER SALINE STREAMS

(71) Applicants: Compass Minerals Ogden Inc., Overland Park, KS (US); Colorado School of Mines, Golden, CO (US)

(72) Inventors: Kerri L. Hickenbottom, Golden, CO (US); Tzahi Cath, Golden, CO (US); Daniel K. Pannell, Overland Park, KS (US); Jerry Poe, Hutchinson, KS (US); Corey R. Milne, Ogden, UT (US)

(73) Assignees: Compass Minerals Ogden Inc., Overland Park, KS (US); Colorado School of Mines, Golden, CO (US)

( * ) Notice: Subject to any disclaimer, the term of this patent is extended or adjusted under 35 U.S.C. 154(b) by 743 days.

(21) Appl. No.: 15/084,202

(22) Filed: Mar. 29, 2016

(65) Prior Publication Data

US 2016/0280565 A1 Sep. 29, 2016

Related U.S. Application Data

(63) Continuation of application No. 13/915,465, filed on Jun. 11, 2013, now abandoned.
(Continued)

(51) Int. Cl.
*C02F 1/44* (2006.01)
*B01D 61/36* (2006.01)
(Continued)

(52) U.S. Cl.
CPC ............ *C02F 1/447* (2013.01); *B01D 61/364* (2013.01); *B01D 2311/103* (2013.01);
(Continued)

(58) Field of Classification Search
CPC ............ B01D 1/364; B01D 2311/2669; B01D 2311/2673; B01D 2321/04; B01D 65/02;
(Continued)

(56) References Cited

U.S. PATENT DOCUMENTS 4,266,026 A * 5/1981 Breslau .................. B01D 69/08
210/632
4,746,437 A 5/1988 Koseki et al.
(Continued)

FOREIGN PATENT DOCUMENTS

CL 199601032 6/1996
CN 1880236 A 12/2006
(Continued)

OTHER PUBLICATIONS

Marek Gryta, Fouling in direct contact membrane distillation process, 325 J. Membrane Sci., 383, 383-394 (2007). (Year: 2007).*
(Continued)

*Primary Examiner* — Brad Gordon
(74) *Attorney, Agent, or Firm* — Hovey Williams LLP

(57) ABSTRACT

A novel method of producing concentrated streams or otherwise useful hypersaline brines from a source of non-potable or otherwise impaired water is provided. The method comprises feeding the source water into the feed side of a membrane distillation unit while simultaneously feeding a distillate stream through the receiving side of the distillation unit. The feed and receiving sides are separated by a hydrophobic, microporous membrane that allows water vapor to flux through the membrane to the receiving side. As the membrane becomes clogged with particulates, the unit can be subjected to stream flow reversal and/or temperature gradient reversal in order to remove those particulates and restore previous vapor flux levels, after which previous operations can be resumed.

27 Claims, 7 Drawing Sheets

Related U.S. Application Data

(60) Provisional application No. 61/658,244, filed on Jun. 11, 2012.

(51) Int. Cl.
  *C02F 103/00* (2006.01)
  *C02F 103/08* (2006.01)
  *C02F 101/10* (2006.01)

(52) U.S. Cl.
  CPC .... *B01D 2311/106* (2013.01); *C02F 2101/10* (2013.01); *C02F 2103/001* (2013.01); *C02F 2103/08* (2013.01); *C02F 2301/063* (2013.01); *C02F 2303/16* (2013.01); *C02F 2303/22* (2013.01); *Y02A 20/124* (2018.01); *Y02W 10/37* (2015.05)

(58) Field of Classification Search
  CPC ............... B01D 65/08; B01D 24/4631; B01D 24/4642; B01D 24/4647; B01D 24/4668; B01D 29/66; B01D 29/668; B01D 2321/20; B01D 2321/2083; C02F 1/447; C02F 2303/16; Y02A 20/128; Y02A 20/129
  See application file for complete search history.

(56) References Cited

U.S. PATENT DOCUMENTS

| | | | |
|---|---|---|---|
| 5,792,313 A | 8/1998 | Johansson | |
| 6,168,714 B1 | 1/2001 | Ilias et al. | |
| 2002/0139738 A1* | 10/2002 | Fujie | B01D 63/043 210/184 |
| 2006/0076294 A1* | 4/2006 | Sirkar | B01D 69/08 210/640 |
| 2006/0144788 A1* | 7/2006 | Cath | C02F 1/447 210/640 |
| 2007/0241066 A1 | 10/2007 | Bishop et al. | |
| 2009/0071902 A1* | 3/2009 | Stover | F01K 27/005 210/637 |
| 2009/0205490 A1 | 8/2009 | Wang et al. | |
| 2010/0051544 A1 | 3/2010 | Berg et al. | |

FOREIGN PATENT DOCUMENTS

| | | | |
|---|---|---|---|
| EP | 0527913 B2 * | 7/2000 | ........... B01D 67/003 |
| GB | 2388557 A * | 11/2003 | ........... B01D 24/008 |
| JP | S62-279808 | 12/1987 | |

OTHER PUBLICATIONS

International Search Report and Written Opinion dated Sep. 23, 2013, in PCT/US2013/045247 filed Jun. 11, 2013.
International Preliminary Report on Patentability dated Dec. 16, 2014, in PCT/US2013/045247 filed Jun. 11, 2013.
G. Raluy et al., "Life Cycle Assessment of MSF, MED and RO Desalination Technologies," Energy 31 (2006) 2361-2372.
K.W. Lawson et al., "Membrane distillation," Journal of Membrane Science 124 (1997) 1-25.
L. Martinez-Diez et al., "Temperature and concentration polarization in membrane distillation of aqueous salt solutions," Journal of Membrane Science 156 (1999) 265-273.
R.W. Schofield at al., "Heat and mass transfer in membrane distillation," Journal of Membrane Science 33 (1987) 299-313.
S. Lee et al., "Effect of operating conditions on CaSO4 scale formation mechanism in nanofiltration for water softening," Water Research, vol. 34, No. 15 (2000) 3854-3866.
S. Shirazi et al., "Comparison of Fouling Mechanism by CaSO4 and CaHPO4 on Nanofiltration Membranes," Separation Science and Technology, 41:13 (2006) 2861-2882.
B. Mi et al., "Gypsum Scaling and Cleaning in Forward Osmosis: Measurements and Mechanisms," Environmental Science & Technology, vol. 44, No. 6 (2010) 2022-2028.
M. Gryta, "Fouling in direct contact membrane distillation process," Journal of Membrane Science 325 (2008) 383-394.
F. He et al., "Studies on scaling of membranes in desalination by direct contact membrane distillation: CaCO3 and mixed CaCO3/CaSO4 systems," Chemical Engineering Science 64 (2009) 1844-1859.
J.H. Hanemaaijer et al., "Memstill membrane distillation—a future desalination technology," Desalination 199 (2006) 175-176.
E. Drioli et al., "Integrated system for recovery of CaCO3, NaCl and MgSO4•7H2O from nanofiltration retentate," Journal of Membrane Science 239 (2004) 27-38.
X. Ji et al., "Membrane distillation-crystallization of seawater reverse osmosis brines," Separation and Purification Technology 71 (2010) 76-82.
C.R. Martinetti et al., "High recovery of concentrated RO brines using forward osmosis and membrane distillation," Journal of Membrane Science 331 (2009) 31-39.
D. Qu et al., "Study on concentrating primary reverse osmosis retentate by direct contact membrane distillation," Desalination 247 (2009) 540-550.
J.-P. Mericq et al., "Vacuum membrane distillation of seawater reverse osmosis brines," Water Research 44 (2010) 5260-5273.
F. Suarez, et al., "A theoretical study of a direct contact membrane distillation system coupled to a salt-gradient solar pond for terminal lakes reclamation," Water Research 44 (2010) 4601-4615.
S. Al-Obaidani et al., "Potential of membrane distillation in seawater desalination: Thermal efficiency, sensitivity study and cost estimation," Journal of Membrane Science 323 (2008) 85-98.
G. Zuo et al., "Energy efficiency evaluation and economic analyses of direct contact membrane distillation system using Aspen Plus," Desalination 283 (2011) 237-244.
H. Chang et al., "Simulation of membrane distillation modules for desalination by developing user's model on Aspen Plus platform," Desalination 249 (2009) 380-387.
A.M. Alklaibi, "The potential of membrane distillation as a stand-alone desalination process," Desalination 223 (2008) 375-385.
H. Yu et al., "Numerical simulation of heat and mass transfer in direct membrane distillation in a hollow fiber module with laminar flow," Journal of Membrane Science 384 (2011) 107-116.
E. Curcio et al., "Membrane Crystallizers," Ind. Eng. Chem. Res., 2001, 40, 2679-2684.
F. Macedonio et al., "Wind-Aided Intensified evaporation (WAIV) and Membrane Crystallizer (MCr) integrated brackish water desalination process: Advantages and drawbacks," Desalination 273 (2011) 127-135.
G.D. Profio et al., "Supersaturation Control and Heterogeneous Nucleation in Membrane Crystallizers: Facts and Perspectives," Ind. Eng. Chem. Res., 2010, 49,11878-11889.
J.T.M. Sluys et al., Water treatment in a Membrane-Assisted Crystallizer (MAC), Desalination 104 (1996) 135-139.
C.Y. Tai, "Crystal growth kinetics of two-step growth process in liquid fluidized-bed crystallizers," Journal of Crystal Growth 206 (1999) 109-118.
E. Curcio et al., "Hybrid nanofiltration-membrane crystallization system for the treatment of sulfate wastes," Journal of Membrane Science 360 (2010) 493-498.
E. Drioli et al., "Progress in membrane crystallization," Current Opinion in Chemical Engineering, 2012, 1:178-182.
M. Gryta, "Concentration of NaCl solution by membrane distillation integrated with crystallization," Separation Science and Technology, 37:15 (2002) 3535-3558.
M. Gryta, "Direct Contact Membrane Distillation with Crystallization Applied to NaCl Solutions," Chem. Pap. 56 (1) 14-19 (2002).
M. Gryta, "Long-term performance of membrane distillation process," Journal of Membrane Science 265 (2005) 153-159.
M. Gryta et al., "The influence of polypropylene degradation on the membrane wettability during membrane Tistillation," Journal of Membrane Science 326 (2009) 493-502.

(56) References Cited

OTHER PUBLICATIONS

F. He et al., "Potential for scaling by sparingly soluble salts in crossflow DCMD," Journal of Membrane Science 311 (2008) 68-80.

F. He et al., "Effects of antiscalants to mitigate membrane scaling by direct contact membrane distillation," Journal of Membrane Science 345 (2009) 53-58.

L.D. Nghiem et al., "A scaling mitigation approach during direct contact membrane distillation," Separation and Purification Technology 80 (2011) 315-322.

K. He et al., "Production of drinking water from saline water by direct contact membrane distillation (DCMD)," Journal of Industrial and Engineering Chemistry 17 (2011) 41-48.

T.Y. Cath et al., "Experimental study of desalination using direct contact membrane distillation: a new approach to flux enhancement," Journal of Membrane Science 228 (2004) 5-16.

A. Perez-Gonzalez et al., "State of the art and review on the treatment technologies of water reverse osmosis concentrates," Water Research 46 (2012) 267-283.

M. Gryta, "Wettability of polypropylene capillary membranes during the membrane distillation process," Chemical Papers 66 (2) 92-98 (2012).

Office Action dated Sep. 29, 2015 in corresponding U.S. Appl. No. 13/915,465, filed Jun. 11, 2013 (18 pages).

Waterman, Dillon, "Bench-Scale Analysis of Ultrafiltration Membranes for Investigating Fouling by Natural Organic Matter in Surface Water," University of Ottawa 59 (2008).

El-Bourawi et al. "A framework for better understanding membrane distillation separation process," Journal of Membrane Science 285 (2006) 4-29.

World Water Assessment Programme, The United Nations World Water Development Report 4, Managing Water under Uncertainty and Risk, UNESCO, Paris, France, 2012. ( not attached, but available at http://unesdoc.unesco.org/images/0021/002156/215644e.pdf).

M. Mulder, Basic Principles of Membrane Technology, Kluver Academic Publishers, Dordrecht, The Netherlands, 1991. (Book not available).

P.A. Sturm, J.W. Gwynn, Great Salt Lake: A Scientific, Historical and Economic Overview, Utah Geological and Mineral Survey, Salt Lake City, Utah, 1980. (Book not available).

Machine Translation in English of JPS62-279808 (9 pages).

\* cited by examiner

METHODS FOR SUSTAINABLE MEMBRANE DISTILLATION CONCENTRATION OF HYPER SALINE STREAMS

RELATED APPLICATIONS

This application is a continuation of U.S. patent application Ser. No. 13/915,465, filed on Jun. 11, 2013, and entitled, METHODS FOR SUSTAINABLE MEMBRANE DISTILLATION CONCENTRATION OF HYPER SALINE STREAMS, incorporated by reference herein. U.S. patent application Ser. No. 13/915,465 claims the priority benefit of a U.S. provisional application entitled, METHODS FOR SUSTAINABLE MEMBRANE DISTILLATION CONCENTRATION OF HYPER SALINE STREAMS, U.S. Ser. No. 61/658,244, filed Jun. 11, 2012, incorporated by reference herein.

BACKGROUND OF THE INVENTION

1. Field of the Invention

The present invention is broadly concerned with liquid-treatment methods, and particularly methods usable for producing concentrated stream or otherwise useful hypersaline brines from a source of non-potable or otherwise impaired water using membrane distillation.

2. Description of the Prior Art

As the demand for minerals and salts has grown, industry has long sought processes for further concentration and harvesting of salts from saline water, such as seawater, lake water, or brackish ground water. Some processes that have been used to desalinate and concentrate water are distillation, crystallization, and membrane processes, such as reverse osmosis, nanofiltration, and electrodialysis. Natural or enhanced evaporation in ponds are also being used for concentration and harvesting of minerals and salts.

Water removal rate is a major economic parameter of mineral recovery and production. However, this parameter is typically limited in existing processes. For example, open ponds are strongly affected by weather and climate. Membrane-based systems may suffer additional problems. For example, membrane fouling and scaling in pressure-driven membrane processes (e.g., in reverse osmosis and nanofiltration) are often a major area of concern, as they can increase the cost of operating and maintaining the systems. Pretreatment of the feed water is a way of reducing fouling and scaling, but is typically expensive. An additional drawback of most membrane-based systems is that the increased salt content of the feed stream typically reduces the throughput of water across the membrane, due to the lower water activity (high osmotic pressure) of the feed solution or otherwise low or no driving force for mass transport across the membrane.

Open evaporation ponds are a common practice to concentrate saline and hypersaline water to supply the growing demand for minerals and other beneficial salts or soluble materials. However, a limited supply of land resources, environmental constraints, and long natural evaporation time limit the rate of mineral separation and harvesting.

Membrane distillation is an emerging technology for concentration and extraction of water from a variety of streams. Such examples of process applications include purifying industrial waters (i.e., cooling tower, boilers, etc.), zero-liquid discharge brine management, mineral harvesting, chemical and pharmaceutical purification, food processing, and solvent extraction. In recent years, attention has been drawn to extending the application of membrane distillation as a possible replacement to reverse osmosis (RO) and nanofiltration (NF) for desalination of seawater and brackish water.

Membrane distillation is a thermally-driven membrane process that can utilize low-grade heat to extract pure water from impaired streams. In this process, an impaired stream, referred to as the feed stream or source water, and a distillate stream are flowing on the opposite sides of a hydrophobic, microporous membrane. The difference in partial vapor pressures of the two streams controls the mass transport of water vapors in membrane distillation: water evaporates from a heated feed stream of high salinity, diffuses through the pores of the membrane, and condenses into a cooler distillate stream on the opposite side of the membrane.

One of the advantages of this membrane process over pressure driven membrane processes in concentrating impaired streams is its reduced fouling potential at high concentrations (or high osmotic pressures); the hydrophobic microporous membrane acts merely as an inert barrier to the two streams. Past studies demonstrated that membrane distillation has a lower fouling potential, higher rejection of non-volatile compounds, higher water recovery, and lower energy consumption when combined with a low-grade heat source.

Recent studies have demonstrated membrane distillation's capability to operate with hypersaline brines (feed stream) nearing solution saturation. However, once the concentrated brine nears solution saturation, the precipitates begin to scale the membrane, and thus impede the vapor flux. Membrane wetting can also occur as a result of membrane scaling; crystal growth migrates into the pores of the membranes and creates a passage for water to flow through. Both membrane scaling and wetting decrease process efficiency by inhibiting water vapor flux and decreasing the rejection of inorganic compounds. Current scaling mitigation techniques for membrane scaling include addition of scale inhibitors to the feed stream, pH adjustors, and surface modification. Membrane cleaning is also implemented. However, these techniques require the use of chemicals, adding to operational costs and decreasing process sustainability.

SUMMARY OF THE INVENTION

The present invention provides a method of concentrating water comprising. In the inventive method, a membrane distillation unit is provided. The unit comprises a feed side having an inlet and an outlet, and a receiving side having an inlet and an outlet. A membrane is positioned between the feed and receiving sides, and is in communication with both the feed side and the receiving side. The method further comprises passing a source water having a first temperature through either the feed side or the receiving side, and a distillate stream having a second temperature through the other of the feed side or the receiving side. The first temperature is higher than the second temperature, thereby creating a vapor pressure gradient across the membrane, causing a vapor flux from the source water to the distillate stream. One or more of the following is then carried out:
  (i) ceasing the source water and distillate stream passing and causing the distillate stream to pass through the side through which the source water was passing prior to the ceasing;
  (ii) reversing the passing so that the source water and distillate stream pass through the opposite sides from the sides through which they were passing prior to the reversing;

(iii) ceasing the passing of the source water and causing a cooling stream to pass through the side through which the source water was passing prior to the ceasing, the cooling stream having a temperature that is lower than the distillate stream second temperature; and (iv) ceasing the passing of the distillate stream and causing a heated water stream to pass through the side through which the distillate stream was passing prior to the ceasing, the heated water stream having a temperature that is higher than the source water first temperature.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENTS

Terms

Figure 1:
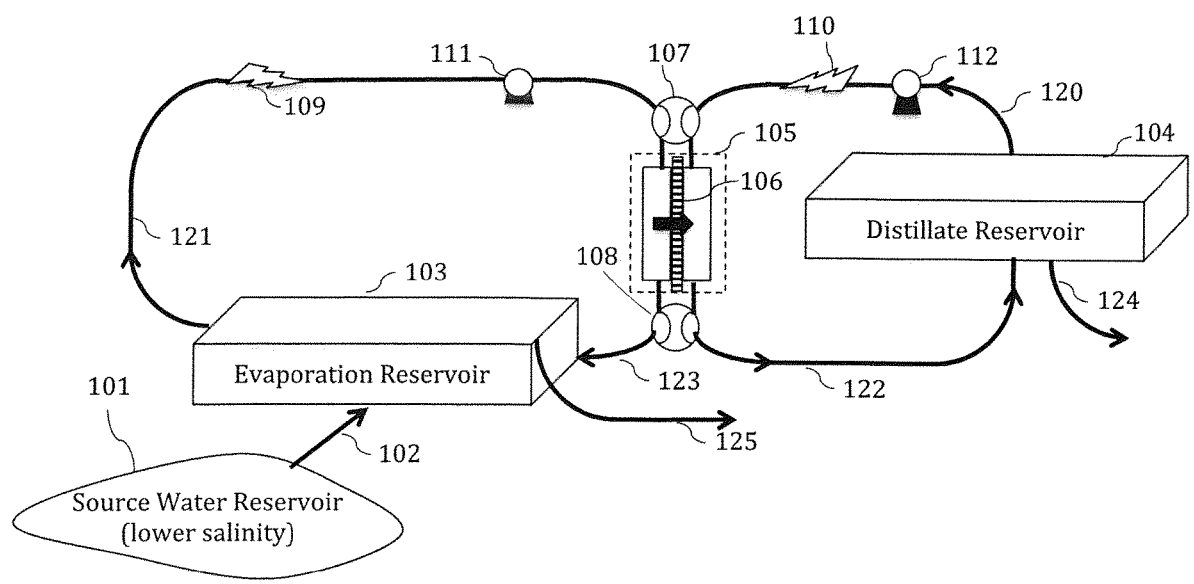
FIG. 1 is a schematic hydraulic diagram of a membrane distillation system in flow reversal mode.

The following terms are used herein:

"Seawater" (abbreviated "SW") is saline water from the sea or from any source of brackish water.

"Source water" is water, such as brackish water, impaired water, wastewater, chemical processing streams, sea water, lake water, solar pond water, or reservoir water, input to a treatment process, such as a desalination or concentration process.

"Hypersaline water" is supersaturated brine stream produced during the membrane concentration process.

"Impaired Water" is any water that does not meet potable water quality standards.

"Concentrate" is a by-product of a water treatment processes having a higher concentration of a solute or other material than the feed water, such as a brine by-product produced by a desalination or a concentration process.

"Distillate" is a solution having a relatively low osmotic potential that can be used to extract water from a solution having a relatively high osmotic potential. In certain embodiments, the distillate solution may be a deionized water or a fresh drinking water.

"Receiving stream" is a stream that receives water by a water purification or extraction process. For example, in membrane distillation, the distillate solution is a receiving stream that receives water from a feed stream of water having a high osmotic potential than the receiving stream.

"Solar pond" is a natural or an engineered, salinity gradient pond having a higher salt concentration layer at the bottom of the pond and lower salt concentration layer on the top. In a solar pond, heat is captured at the bottom of the pond, and therefore, the temperature of the water at the bottom of the pond is much higher than the temperature of the water at the top of the pond.

"Hypersaline evaporation reservoir" is an evaporation pond in which the water is supersaturated and precipitated minerals may have settled at the bottom of the reservoir.

In addition, the terms "upstream" and "downstream" are used herein to denote, as applicable, the position of a particular component, in a hydraulic sense, relative to another component. For example, a component located upstream of a second component is located so as to be contacted by a hydraulic stream (flowing in a conduit for example) before the second component is contacted by the hydraulic stream. Conversely, a component located downstream of a second component is located so as to be contacted by a hydraulic stream after the second component is contacted by the hydraulic stream.

The present disclosure provides methods for a unique flow regime to hinder scale formation on membrane surfaces. In one embodiment, a membrane is placed in a flow cell, inbetween two flow streams (i.e., a feed/source and a permeate/distillate streams). In a particular implementation, the feed stream contains a high solute concentration, and the permeate/distillate stream with a solute concentration lower than in the feed stream. In a more particular example, the feed stream is salt water and the distillate stream is fresh water.

In a further aspect, the feed solution (also referred to as "source water") and the distillate stream can be under positive or negative pressures. In a further aspect of this disclosure, the vapor from the solution with the higher partial vapor pressure diffuses across the membrane into the solution of lower partial vapor pressure. In one embodiment, the difference in partial vapor pressures of the two solutions is achieved by obtaining a temperature gradient. In a particular implementation, the temperature of the feed solution is at least 5° C. higher than the temperature of the distillate stream, preferably from about 5° C. to about 70° C. higher, more preferably from about 10° C. to about 50° C. higher, and even more preferably from about 10° C. to about 20° C. higher (15° C. being most ideal). Accordingly, a portion of the feed solution vaporizes, diffuses through the pores of the membrane, and condenses into the distillate stream. In a particular example, the temperature of the feed stream is about 50° C., and the temperature of the distillate stream is about 30° C.

In a further aspect, the difference in partial vapor pressure (i.e., the feed temperature higher than the distillate temperature) can be changed to reverse the direction of vapor flow through the membrane. In a particular example, the distillate stream can be at least 5° C. higher than the temperature of the feed stream for a period of time. Preferred other temperature differences are similar to those discussed in the preceding paragraph. Accordingly, a portion of the distillate stream vaporizes, diffuses through the pores of the membrane, and condenses in the feed stream. In this particular aspect, the reversal of scaling can be achieved. In a further particular example, the changing of the flow regime can be completed periodically. In another example, the changing of the flow regime can be done for any amount of time. In one example, the temperature of the feed can be ambient temperature and the temperature of the distillate stream can be greater than ambient temperature. In a particular example, the temperature of the feed stream is 20° C. and the temperature of the distillate stream is 30° C.

In at least one embodiment, the feed and distillate solutions can run co-currently in a flow cell containing the membrane. In another embodiment, the feed and distillate solutions can run counter currently in the flow cell. In a particular implementation, the feed and the distillate streams can be switched on either side of the membrane. In a more particular implementation, the feed and the distillate streams sides are switched to opposite sides of the membrane to prevent membrane scaling. In a particular example, the feed side of the membrane becomes the distillate channel and the distillate side of the membrane becomes the feed channel. In a particular example, the changing of the flow regime can be completed periodically. In another example, the changing of the flow regime can be done for any amount of time.

In at least one embodiment, the membrane is a hydrophobic, microporous membrane. In a particular implementation, the membrane is made from Teflon (polytetrafluoroethylene), or polypropylene. In particular implementation, the membrane has pore sizes of from about 0.03 microns to about 0.6 microns, preferably from about 0.22 microns to about 0.6 microns, and more preferably from about 0.22 microns to about 0.5 microns. The membrane may have a single layer or multiple layers, and include a support layer. In certain examples, the membrane has one active layer.

In one configuration, the membrane is flat. In one example, the membrane is placed in a flow cell, in which the membrane is held in place by fasteners or adhesives such as by clamps, screws, pins, tape, glue, or clips. In one case, the flat membrane is secured between two plates. In one embodiment, a frame (or a gasket) is placed between a plate and the flat membrane. In a more particular example, frame may have flow ducts and flow channels and include gaskets and spacers to conduct the distillate solution or the feed solution proximate to the membrane.

In one configuration, the flow cell may be a vessel, in which the membrane is spirally wound inside. In a particular implementation, spacers are used to provide support to the membrane. In a particular example the spacers are of plastic mesh. In another example, the spacers are plastic rods or plastic blocks with channels formed therein.

Embodiments of the present disclosure provide methods for concentrating a liquid, such as increasing its solute concentration. In particular implementations, the liquid to be concentrated is seawater, saline lake water, brackish-water, impaired-water, wastewater, chemical processing inflow, intermediate, or effluent stream, or other sources (generally referred to as source water). In further implementations, the source water is concentrated to a supersaturation level and potentially precipitating solutes out of solution.

In one aspect, systems are provided for concentrating a liquid, such as source water. In one embodiment, the system includes a reservoir with hypersaline water, such as supersaturated brine from an evaporation pond, in combination with an upstream membrane distillation unit, or plurality of membrane distillation units, that concentrate the source water feeding the hypersaline evaporation pond. The upstream membrane distillation unit is located hydraulically upstream of the hypersaline water reservoir and downstream from a source water and is configured to also receive a stream of fresh, colder water. In a particular implementation, the fresh colder water is drawn from the reservoir of fresh water and in another implementation the fresh water is drawn from a cooling tower or heat exchanger. The cold fresh water passes through the upstream forward-osmosis unit on a receiving side of a hydrophobic microporous membrane in the upstream forward-osmosis unit. Meanwhile, a stream liquid having a relatively low osmotic potential (e.g., a liquid having a low salinity compared to the hypersaline water) flows from a reservoir of the source water, is heated, and then passes through the upstream membrane distillation unit on a feed side of the membrane, which results in a net transfer of water through the membrane from low salinity source water to the colder fresh water, concentrating the sources water to become hypersaline water. In a particular implementation, the resulting diluted fresh water is routed to the source water reservoir, and the concentrated sources water is routed into a hypersaline evaporation pond. In another implementation the diluted fresh water may be used as a source of drinking water. By concentrating the source water, some desirable or undesirable constituents may precipitate out of the solution in a controlled manner, and desirable constituents will be further concentrated in the source water before transferring the concentrated source water into a hypersaline evaporation reservoir. Thus, the membrane distillation unit pre-concentrates the source water and thereby reducing the land footprint of the evaporation reservoirs.

A further embodiment of the system includes the components of the previous embodiment and further includes a solar pond unit that absorbs and stores thermal energy at the bottom of the pond. The solar pond unit is located upstream of the upstream membrane distillation unit. The solar pond unit provides heat to elevate the temperature, and thus the vapor pressure, of the source water feeding the upstream membrane distillation unit. Hot water from the solar pond unit, or plurality of solar pond units, is passing through a heat exchange unit upstream from the membrane distillation unit, thereby heating the incoming source water and cooling the hot solar pond water. In particular implementations, the hot water from the solar pond unit is blended with the source water stream in the heat exchanger unit upstream from the upstream membrane distillation unit.

The use of an evaporative membrane concentration unit may be advantageous compared to other concentration techniques, such as reverse osmosis, because the evaporative membrane concentration unit, such as a membrane distillation unit, may be less susceptible to membrane fouling. Furthermore, the reduced susceptibility to membrane fouling may reduce the need to pre-treat the feed stream for the evaporative membrane concentration unit.

The systems described above may be used for processes other than the concentration of minerals in hypersaline reservoirs. Other processes may include concentration of brackish water, concentration of foods or beverages, and concentration or purification of chemical or pharmaceutical products.

There are additional advantages of the subject matter described herein. For example, the rate of concentration through currently commercially available membrane is relatively low under the conditions encountered in a mineral recovery plant. Nevertheless, this low concentration rate is more than two orders of magnitude higher than the natural evaporation in many natural evaporation ponds.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. A particular embodiment need not provide all features noted above, nor solve all problems or address all issues in the background noted above.

Membrane Distillation and Vacuum-Enhanced Membrane Distillation

Membrane distillation (MD) is a membrane separation process that combines simultaneous mass and heat transfer through a hydrophobic, microporous membrane. Mass transfer in this process is carried out by evaporation of a volatile solute or a volatile solvent (e.g., water), when the solute is non-volatile. The driving force for mass transfer in the process is the vapor pressure difference across the membrane.

Direct contact membrane distillation (DCMD) is one of four basic configurations of MD. In this configuration a feed solution at elevated temperature is in contact with one side of the membrane, and colder water is in direct contact with the opposite side of the membrane; it is mainly the temperature difference between the liquids, and to some extent their solute concentration, that induces the vapor pressure gradient for mass transfer.

Mass transfer in DCMD is a three-step process involving: (1) diffusive transport from the feed stream to the membrane interface; (2) combined diffusive and convective transport of the vapors through the membrane pores; and (3) condensation of the vapors on the membrane interface on the product side of the membrane.

In vacuum-enhanced DCMD, the configuration of the membrane unit is slightly modified so that the distillate (fresh cold water) stream flows under a negative pressure (vacuum) on the product side of the membrane. Further deepening of the vacuum on the distillate side can result in a linear increase in the flux of water. When compared to traditional DCMD configuration, water flux for the deepest vacuum investigated (55 kPa) increased up to 84%.

Membrane Distillation Concentration of Hypersaline Brines

With a suitable membrane distillation hydrophobic microporous membrane, a relatively high water flux can be realized and the feed stream can be substantially concentrated. For example, a distillate stream having a low solute concentration and a temperature 20° C. lower than that of seawater can produce flux of at least 15 Liter/(m$^2$·hr) of clean water through the suitable membrane distillation membrane into the distillate stream from a stream having a solute concentration of seawater or even five times that of seawater. Thus, using membrane distillation, saline water can be further concentrated even to above its solutes saturation concentrations using vapor pressure difference (or temperature difference) across the membrane distillation membrane and correspondingly reducing the energy required to concentrate the saline feed stream. The concentrated hypersaline brine produced may be used as a feed stream to mineral recovery systems.

While membrane distillation is relatively simple to establish and operate, membrane scaling and fouling tend to reduce the performance of the process, especially when treating hypersaline streams. Low performance may include low water flux due to a cake layer of organic or inorganic solids that have accumulated on the membrane surface on the feed side; pore blockage due to penetration of solids into the membrane pores; and/or pore wetting, which occurs due to penetration of feed/source water into the membrane pore and results in convective flow of feed water into the distillate water on the receiving side of the membrane. The latter will result in low rejection of salts and other solutes by the membrane distillation membrane.

In order to facilitate sustainable desalination of hypersaline streams, methods are needed to mitigate membrane scaling and fouling to prevent the loss of membrane integrity and process performance. The methods of the present invention may be applied in a variety of ways. The disclosed method of operation under alternating flow channels is referred to as membrane distillation flow reversal ("MDFR"), whereas the disclosed method of operating under alternating temperature gradients is referred to as membrane distillation temperature gradient reversal ("MDTGR").

The disclosed methods can be used for a variety of membrane distillation operations, including, but not limited to, direct contact membrane distillation, vacuum enhanced membrane distillation, air gap membrane distillation, etc. Additionally, the disclosed methods can present a number of advantages compared to the aforementioned process applications (i.e., process applications include purifying industrial waters, zero-liquid discharge brine management, mineral harvesting, chemical and pharmaceutical purification, food processing, and solvent extraction), particularly in desalination and brine management.

An advantage of operating membrane systems in MDFR and MDTGR mode is that they can improve membrane integrity by mitigating scale formation and membrane wetting. In mitigating membrane scaling and wetting, the membrane lifetime can be extended, thus reducing the need for membrane replacement and lowering maintenance costs. Additionally, implementing these unique flow reversal methods can clean the membrane in situ, without disturbing normal operations, and eliminate the need for cleaning with chemicals. Finally, operating in flow reversal mode improves operation once the membrane has scaled.

Cost benefits are also associated with this process and include using low-grade heat source. Additionally, the temperature gradient used for MDTGR may be achieved by capitalizing on the natural temperature gradient present in the cooler, incoming feed stream and the already-heated distillate stream.

First Embodiment of the Invention

Membrane Distillation Flow Reversal (MDFR)

A first exemplary embodiment of the sustainable water-treatment process includes one or more membrane distillation treatment stages to increase source water salinity and simultaneously produce water, while maintaining high permeability and low scaling/fouling of the membrane distillation membrane. In the process, a concentration step is performed in which the source water is concentrated by evaporating water from the source water through a membrane distillation membrane into a fresh water (distillate) stream that in the process is becoming further diluted and warmer, due to absorption of pure hot vapors that crossed the membrane. The fresh water receiving stream is supplied by a distillate reservoir of fresh water, for example river water, or lake water, or groundwater. Although generally described in these exemplary methods for use in concentration of salt water, the methods and systems described in the exemplary embodiments may be applied to other source liquids.

Operation Mode 1:

In FIG. 1, the feed stream is pumped from a source water evaporation reservoir (103) using a pump (111). The feed stream flows through line (121), a heating device (109) (e.g., external heater or heat exchanger), a 4-way crossover valve (107), and the primary feed side of the membrane distillation flow cell/device (105), which houses a membrane distillation membrane (106). The concentrated source water feed stream exits the flow cell through a 4-way crossover valve (108) and returns to the evaporation reservoir (103) via line (123).

The distillate stream is pumped (112) through line (120). The distillate stream flows through a cooling device (110) (e.g., external cooler or heat exchanger), bypasses a 4-way crossover valve (107), proceeds through the primary distillate receiving side of the membrane distillation membrane in the flow cell (105), flows through a 4-way crossover valve (108), and returns to the distillate reservoir (104) via line (122).

Intermediate Mode 1:

At the onset of membrane scaling and coverage with source water precipitates, or when the vapor flux through the membrane distillation membranes declines, pumping of the feed and distillate streams stops. Crossover valve (107) is activated such that the distillate stream (120) is routed to the primary feed inlet of the membrane flow cell, and the distillate stream is pumped to flush the primary feed side of the membrane cell. Rinsing waste is sent back to either the evaporation reservoir (103) or source water reservoir (101). At this time, the concentrated feed from the evaporation reservoir can be drained via stream (125) and sent for further processing. The evaporator reservoir can then be replenished with feed from the source reservoir (101) via line (102). The distillate from the distillate reservoir (104) could also be extracted for beneficial use via line (124).

Operation Mode 2:

Crossover valves (107) and (108) are activated to an intermittent mode in which the 4-way crossover valves re-route the feed and distillate streams to the opposite sides of the membrane. The feed stream continues to flow clockwise through lines (121) and (123); however, the stream is now bypassed to the primary distillate side of the membrane. Similarly, the distillate stream continues to flow counter-clockwise through lines (120) and (122); however, the stream is now passed to the primary feed side of the membrane.

Intermediate Mode 2:

At the onset of membrane scaling, or when the vapor flux through the membranes declines, pumping of the feed and distillate stream stops. Crossover valve (107) is deactivated to its original configuration (i.e., the distillate stream enters the primary distillate side of the membrane) while crossover valve (108) remains open. Consequently, enough distillate stream is pumped to flush the primary distillate side of the membrane. Rinsing waste is sent back to either the evaporation reservoir (103) or source water reservoir (101). Return to operation mode 1.

Second Embodiment of the Invention

Membrane Distillation Temperature Gradient Reversal (MDTGR) A

Figure 2:
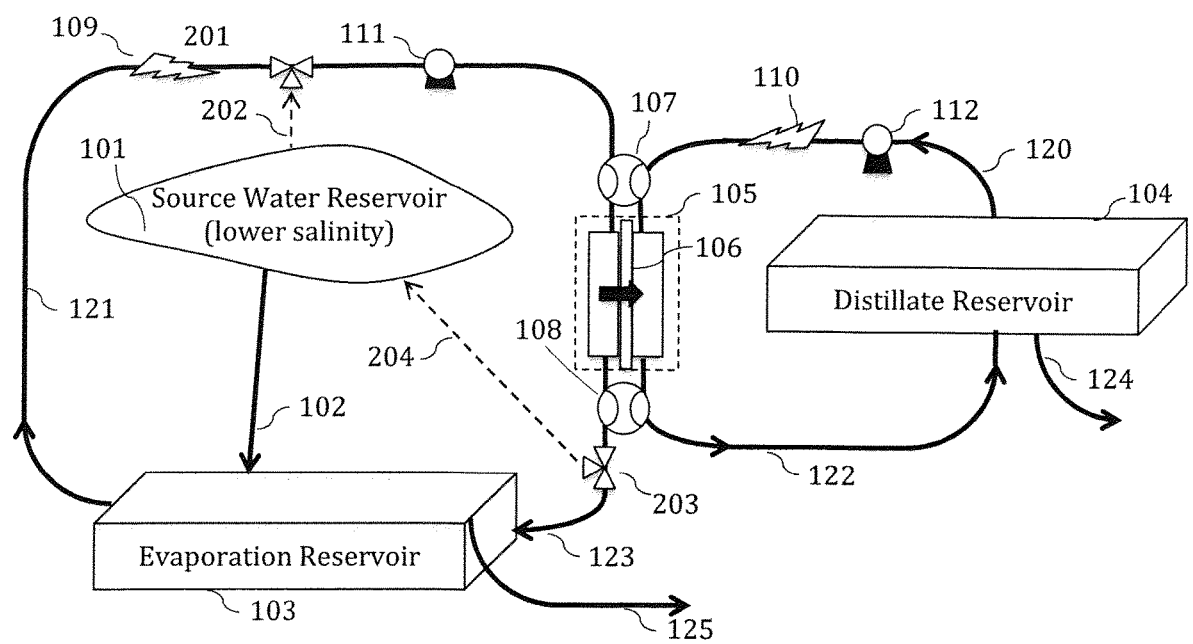
FIG. 2 is a schematic hydraulic diagram of a membrane distillation system in temperature gradient flow reversal mode A.

Operation Mode 1 (FIG. 2):

Feed stream is pumped (111) through line (121). Feed stream flows through a heating device (109) (e.g., external heater or heat exchanger), bypasses a 3-way valve (201) and a 4-way crossover valve (107), proceeds through the primary feed side of the membrane distillation membrane flow cell (105), passes a 4-way crossover valve (108) and a 3-way valve (203), and returns to the evaporation reservoir (103) via line (123).

Distillate stream flows through a cooling device (110) (e.g., external cooler or heat exchanger), bypasses a 4-way crossover valve (107), proceeds through the primary distillate side of the membrane flow cell (105), bypasses a 4-way crossover valve (108), and returns to the distillate reservoir (104) via line (122).

Intermediate Mode 1a:

At the onset of membrane scaling, or when the vapor flux through the membrane (106) declines, pumping of the feed and distillate streams stop, and the 3-way bypass valves (201 and 203) are activated. Source water from the source water reservoir (101), which is at a lower temperature than the distillate water, is pumped (111) through the primary feed side of the membrane. The source water passes the 4-way crossover valve (108), through the 3-way valve (203), and returns to the source water reservoir (101) via line (204).

Meanwhile, the distillate stream, at a higher temperature than the source water stream, resumes being pumped on the primary distillate side of the membrane. The distillate stream flows through a cooling device (110) (i.e., external cooler or heat exchanger), passes a 4-way crossover valve (107), proceeds through the primary distillate receiving side of the membrane flow cell (105), passes through a 4-way crossover valve (108), and returns to the distillate reservoir (104) via line (122). After a brief period of time, the system is returned to operation mode 1.

Third Embodiment of the Invention

Membrane Distillation Temperature Gradient Reversal (MDTGR) B

Figure 3:
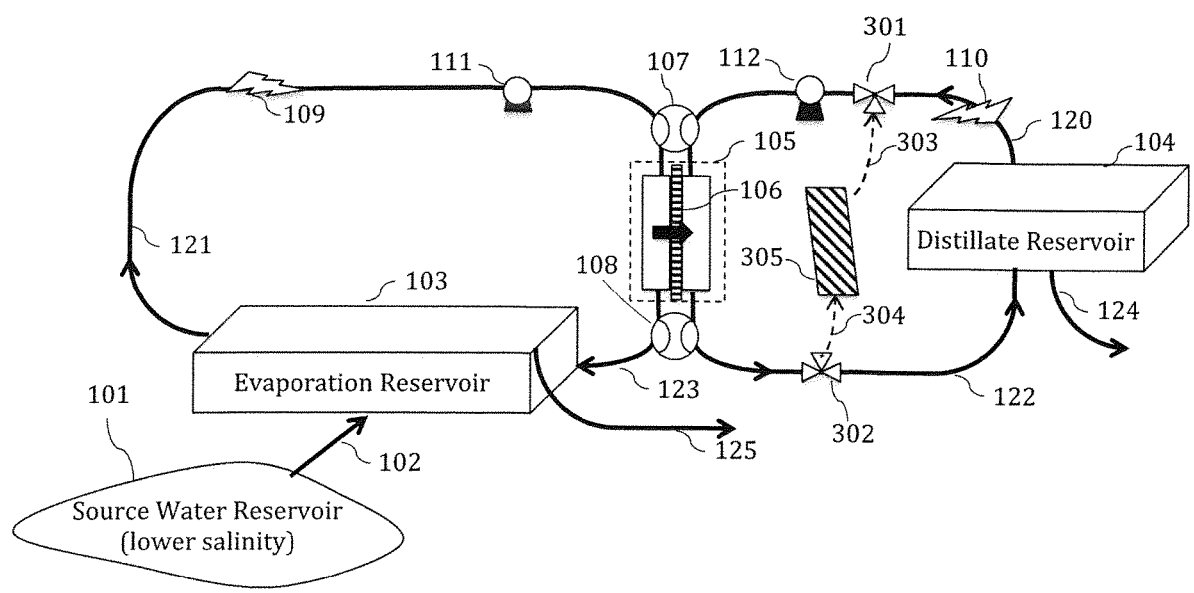
FIG. 3 is a schematic hydraulic diagram of a membrane distillation system in temperature gradient flow reversal mode B.

Operation Mode 1 (FIG. 3):

The feed stream is pumped from the evaporation reservoir (103) using a pump (111).

The feed stream flows through line (121), through a heating device (109) (e.g., external heater or heat exchanger), passes a 4-way crossover valve (107), and through the primary feed side of the membrane distillation flow cell/device (105), which houses an MD membrane (106). The feed exits the flow cell through a 4-way crossover valve (108) and returns to the evaporation reservoir (103) via line (123).

The distillate stream is pumped (112) through line (120). The distillate stream flows through a cooling device (110) (e.g., external cooler or heat exchanger), passes through a 3-way valve (301) and a 4-way crossover valve (107), proceeds through the primary distillate receiving side of the membrane distillation flow cell (105), passes through a 4-way crossover valve (108) and a 3-way valve (302), and returns to the distillate reservoir (104) via line (122).

Intermediate Mode 1b:

At the onset of membrane scaling, or when the vapor flux through the membrane (106) declines, the 3-way valves (301 and 302) are activated, and heated water (at a temperature greater than the feed water) from an external reservoir (305) is circulated on the primary distillate side of the membrane via lines (303) and (304). Operations proceed as in Operation mode 1. After a brief period of time, the system is returned to operation mode 1.

EXAMPLES

The following examples set forth preferred methods in accordance with the invention. It is to be understood, however, that these examples are provided by way of illustration and nothing therein should be taken as a limitation upon the overall scope of the invention.

Materials and Methods 1.1 Membranes

A hydrophobic microporous membrane (PP22) was acquired from GE/Osmonics (Minnetonka, Minn.). The PP22 is an isotropic membrane made of polypropylene (PP), and is approximately 150 microns thick. The membrane has a nominal pore size of 0.22 microns and a porosity of approximately 70%. After experiments, the membranes were rinsed with deionized water and stored in a desiccator until analysis.

1.2 Membrane Cells

Experiments were performed with flat-sheet, acrylic plastic membrane cells. The cells were fabricated with symmetric flow channels on either side of the membrane, allowing for tangential flow of feed and distillate streams on the opposite sides of the membrane. Nitrile rubber gaskets were used to form flow channels, approximately 2 mm deep, on each side of the membrane. Turbulent enhancing spacers were placed in the flow channels to reduce temperature polarization, increase water flux, and ensure that the membrane lay flat and centered in the cell. Experiments were performed using a modified SEPA-CF cell with an effective membrane surface area of 139 cm$^2$. To prevent precipitation of salts on the membrane surface, the membrane cell was positioned horizontally with the feed side (active side) facing down.

1.3 Bench-Scale System

Bench-scale experiments were performed to investigate water flux, salt rejection, and membrane scaling. A supervisory control and data acquisition (SCADA) system (LabVIEW, National Instruments, Austin, Tex.; and a LabJack UE-9 Pro, Lakewood, Colo.) was utilized to control the temperatures of the feed and distillate streams and collect data to calculate water flux and batch recovery.

Figure 4:
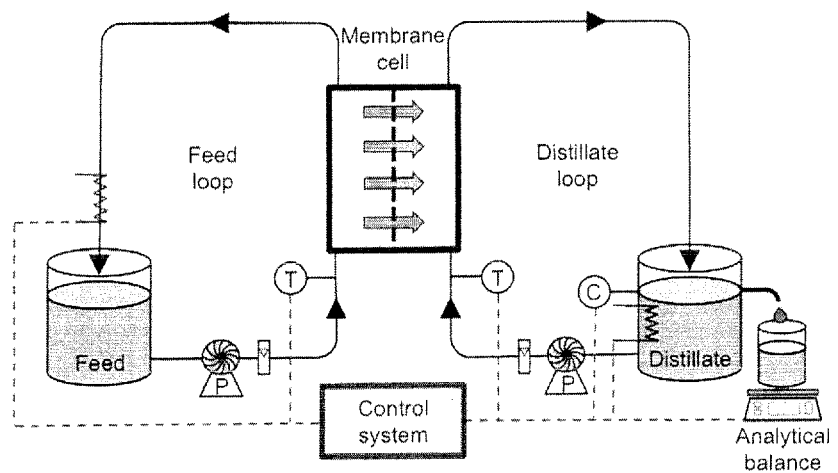
FIG. 4 is a flow schematic of the DCMD bench scale system used in the Example.
Figure 5:
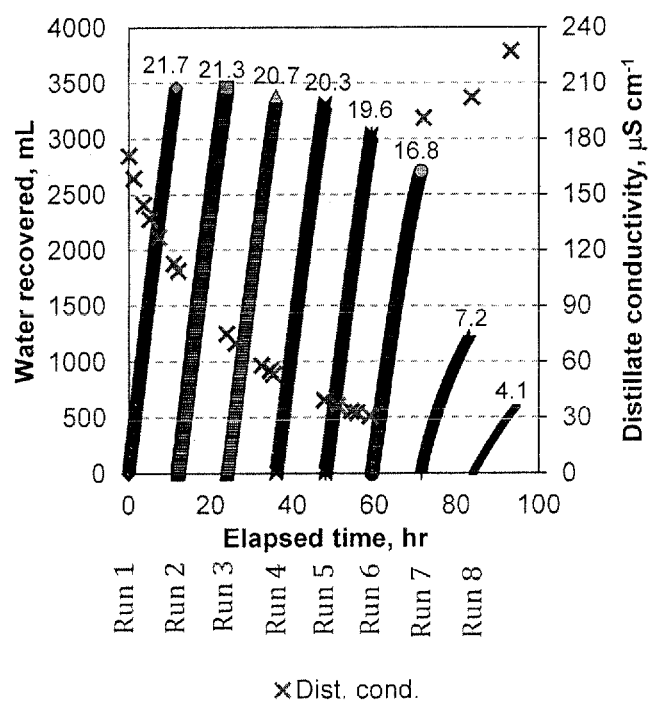
FIG. 5 is a graph showing the water recovered as a function of elapsed time for successive batch experiments performed with the PP22 membrane and filtered GSL feed water at feed and distillate temperatures of 60° C. and 30° C., respectively.
Figure 6:
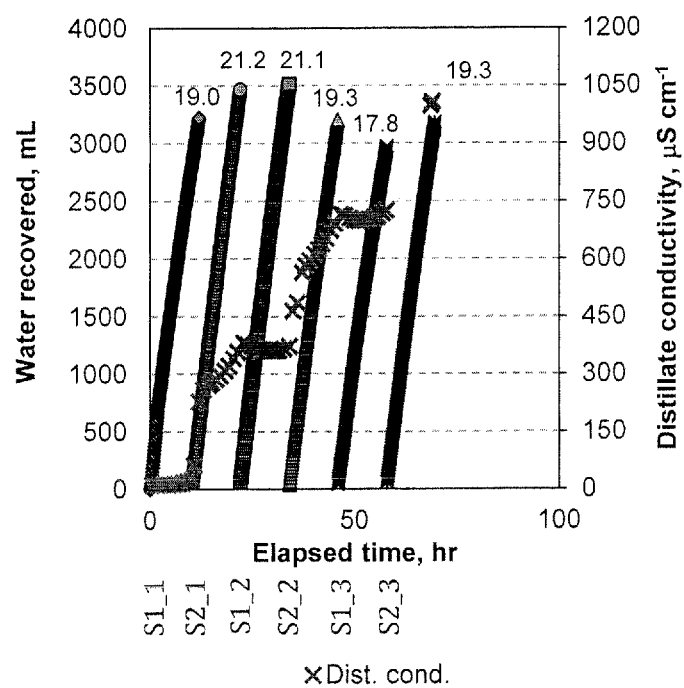
FIG. 6 is a graph depicting water recovered as a function of elapsed time for successive batch experiments with alternating feed and distillate channels where feed and distillate channels were alternated three times each, S1 and S2 denote the initial feed and distillate sides, respectively, and 1, 2, and 3 denote the first, second, and third alternations of the feed and distillate sides.
Figure 7:
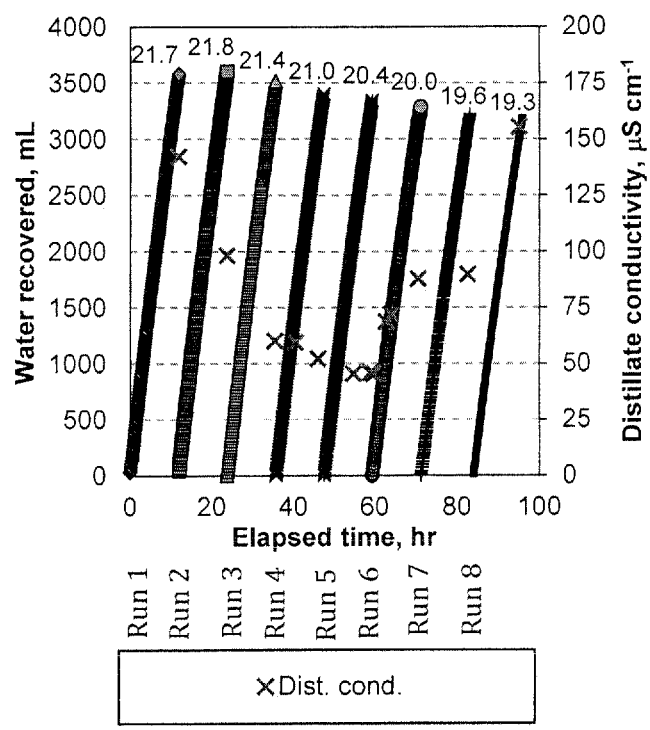
FIG. 7 is a graph of water flux as a function of elapsed time for successive batch experiments performed with temperature reversal.

A flow schematic of the test unit is illustrated in FIG. 4. The thermally insulated feed and distillate reservoirs were connected to gear pumps (Micropump, Cole Parmer, Vernon Hills, Ill.) that circulated the feed and distillate streams co-currently on the opposite sides of the membrane. Thermocouples were installed at the inlets of the feed and distillate channels and connected to the SCADA system. The flow rate of the two streams was 1.6 L min$^{-1}$. As feed water evaporated through the membrane and absorbed into the distillate stream, water overflowed from the distillate reservoir in a beaker positioned on an analytical balance (Model S-8001, Denver Instruments, Bohemia, N.Y.), which was connected to the SCADA system. The overflow rate was used to calculate water flux through the membrane. The conductivity of the distillate reservoir was continuously measured (Waterproof pH/CON 300 Meter, Oakton Instruments, Vernon Hills, Ill.) and changes were used to calculate salt rejection and detect membrane wetting. The results from the following procedures are reported in FIGS. 5-7.

1.4 Direct Contact Membrane Distillation Scale Mitigation Batch Experiments

Three scaling mitigation techniques were investigated to prevent or remove membrane scaling and maintain membrane integrity. Experiments were conducted in a batch mode, simultaneously concentrating the brine feed and producing purified water. The feed solution was representative water from the Bear River Bay (Salt Lake City, Utah) on the eastern shore of the GSL and the distillate solution was deionized water. The raw GSL water was pre-filtered through a 0.5-micron cartridge filter to remove any suspended solids. The batch experiments were performed with the modified SEPA-CF cell, PP22 membrane, and 8.5 L of filtered GSL feed water. The temperatures of the feed and distillate were 60 and 30° C., respectively.

1.4.1 Mitigating Rapid Flux Decline

In the first scale mitigation procedure, DCMD batch experiments were terminated before the water flux rapidly declined. After 12 hours of operation, or when 35-40% of the feed water was recovered, the collected distillate was returned to the feed reservoir which diluted the feed to its original concentration, and the next successive batch experiment began. Eight successive batch experiments were performed without any membrane cleaning between cycles.

1.4.2 Flow Reversal

Similar to the first technique, batch experiments were terminated before scaling occurred on the membrane surface, or after 35-40% of the feed water was recovered. Then, the feed side of the membrane was rinsed with approximately 200 mL of deionized water, and the feed and distillate channels of the membranes were exchanged: the feed side became the distillate side and the distillate side became the feed side. Subsequently, the next successive batch experiment began. This procedure was repeated six times.

1.4.3 Temperature Reversal

Similar to the previous scale mitigation techniques, batch experiments were terminated before scaling occurred on the membrane surface, or after 35-40% of the feed water was recovered. Then, a cooler GSL feed stream (15° C.) was circulated on the feed side of the membrane while the warmer distillate (30° C.) continued to circulate on the distillate side of the membrane. After 20 minutes, another batch concentration cycle started with a new warmer feed stream (60° C. at 150,000 mg/L) and cooler distillate (30° C.) on their respective sides of the membrane. This procedure was repeated eight times.

1.5 Solution Chemistry and Analytical Methods

The GSL water was characterized using standard analytical methods. Water samples were prepared and analyzed for dissolved solids according to Standard Methods (APHA, 2005). Samples were diluted and filtered through a 0.45-micron filter and analyzed for anions and cations with an ion chromatograph (Model ICS-90, Dionex, Sunnyvale, Calif.) and an inductively coupled plasma atomic emission spectrometer (ICP-AES) (Optima 5300 DV, PerkinElmer Inc., Waltham, Mass.), respectively. The average total dissolved solids (TDS) concentration of the GSL water from the Bear River Bay was approximately 150,000 mg/L, most of which is sodium chloride (~84%/o/wt.). A detailed ionic composition of the GSL water is summarized in Table 1.

TABLE 1

Ionic composition of the GSL water. All values are for the cartridge-filtered GSL water.

| Analyte | Concentration, mg/L | Analyte | Concentration, mg/L |
|---|---|---|---|
| $B^{3+}$ | 40.0 | $Si^{4+}$ | 9.16 |
| $Ba^{2+}$ | 1.08 | $Ti^{4+}$ | 1.85 |
| $Ca^{2+}$ | 360 | $Zn^{2+}$ | 1.38 |
| $Fe^{+2}$ | 0.96 | $Sr^{2+}$ | 2.97 |
| $K^+$ | 2,831 | $Cl^-$ | 81,644 |
| $Li^+$ | 24.0 | $Br^-$ | 72 |
| $Mg^{2+}$ | 5,201 | $NO_3^-$ | 13 |
| $Mn^{2+}$ | 0.04 | $SO_4^{2-}$ | 10,316 |
| $Na^+$ | 43,173 | TOC | 56.8 |
| $Ni^{2+}$ | 0.21 | | |
| $S^{2-}$* | 270 | | |

*Sulfur not associated with $SO_4^{2-}$

We claim:

1. A method of concentrating water comprising:
   (a) providing a membrane distillation unit comprising:
      a feed side having an inlet and an outlet;
      a receiving side having an inlet and an outlet; and
      a membrane positioned between the feed and receiving sides, said membrane being in communication with both said feed side and said receiving side;
   (b) passing one or both of a source water having a first temperature or a distillate stream having a second temperature through a 4-way crossover valve;
   (c) passing:
      said source water through either said feed side or said receiving side; and
      said distillate stream through the other of said feed side or said receiving side, said first temperature being higher than said second temperature, thereby creating a vapor pressure difference across said membrane, causing a vapor flux from said source water to said distillate stream; and
   (d) carrying out one or more of the following:
      (i) reversing, via at least the 4-way crossover valve, said passing of step (c) so that said source water having said first temperature and distillate stream having said second temperature pass through the sides other than the sides through which they were passing prior to said reversing;
      (ii) ceasing the passing of said source water in step (c) and causing a cooling stream to pass through the 4-way crossover valve and subsequently through the side through which the source water was passing prior to said ceasing, said cooling stream having a temperature that is lower than said distillate stream second temperature; and
      (iii) ceasing the passing of said distillate stream in step (b) and causing a heated water stream to pass through the 4-way crossover valve and subsequently through the side through which the distillate stream was passing prior to said ceasing, said heated water stream having a temperature that is higher than said source water first temperature,
   wherein during step (d), said vapor pressure difference is reversed, thereby reversing the direction of said vapor flux across said membrane; and
   wherein the method is configured to improve membrane integrity by mitigating scale formation and membrane wetting.

2. The method of claim 1, further comprising heating said source water prior to or during said passing (c).

3. The method of claim 1, further comprising cooling said distillate stream prior to or during said passing (c).

4. The method of claim 1, wherein said source water and distillate stream have respective solute concentrations, wherein the solute concentration in said source water is higher than that in said distillate stream prior to said passing (c).

5. The method of claim 1, wherein said source water is selected from the group consisting of impaired water, chemical processing inflow, liquid foods, biological substances, treated wastewater, wastewater, saline lake water, brackish-water, runoff water, concentrated seawater, seawater, and mixtures of the foregoing.

6. The method of claim 1, wherein the distillate stream is selected from the group consisting of distilled deionized water and potable water.

7. The method of claim 1, wherein the membrane is hydrophobic and micro-porous.

8. The method of claim 1, wherein said membrane comprises a shape selected from the group consisting of flat sheet, spiral wound, and hollow fiber.

9. The method of claim 1, wherein said source water is under a positive or negative pressure.

10. The method of claim 1, wherein said distillate stream is under a positive or negative pressure.

11. The method of claim 1, wherein during said passing (c), said source water and distillate stream are running co-currently.

12. The method of claim 1, wherein during said passing (c), said source water and distillate stream are running counter-currently.

13. The method of claim 1, wherein a modified source stream exits the outlet of either said feed side or said receiving side, and a modified distillate stream exits the outlet of the other of said feed side or said receiving side, wherein said one or both of the modified source stream and modified distillate stream pass through another 4-way crossover valve after exiting the respective outlets.

14. The method of claim 1, said method comprising carrying out (i), wherein during said passing (c), precipitates collect on said membrane, and during said carrying out (i) at least some of said precipitates are removed, so as to at least partially restore membrane permeability.

15. The method of claim 1, said method comprising carrying out (ii), wherein during said carrying out (ii), the cooling stream comes from one or a plurality of fresh water reservoirs.

16. The method of claim 15, wherein said one or plurality of fresh water reservoirs have respective temperatures that are lower than the distillate stream second temperature.

17. The method of claim 1, wherein during said passing (c), precipitates collect on said membrane, and wherein said vapor flux reversal causes at least some of said precipitates to be removed, so as to at least partially restore membrane permeability.

18. The method of claim 1, said method comprising carrying out (iii), wherein during (iii), the heated water stream comes from one or a plurality of fresh water reservoirs.

19. The method of claim 18, wherein said one or plurality of fresh water reservoirs have respective temperatures that are higher than the source water first temperature.

20. The method of claim 1, wherein said first temperature is at least about 5° C. higher than said second temperature.

21. The method of claim 1, wherein during said passing (c), precipitates collect on said membrane, causing a decrease in said vapor flux.

22. The method of claim 21, said method comprising carrying out (ii), wherein said carrying out (ii) is initiated upon detection of said vapor flux dropping below a predetermined level.

23. The method of claim 22, wherein said carrying out (ii) results in the removal of at least some of said precipitates from said membrane, thereby at least partially restoring membrane permeability.

24. The method of claim 23, further comprising resuming said passing (c) after a desired membrane permeability has been restored.

25. The method of claim 1, said method comprising carrying out (ii), wherein during said carrying out (ii), said distillate second stream temperature is at least about 5° C. higher than said cooling stream temperature.

26. The method of claim 1, said method comprising carrying out (iii), wherein during said carrying out step (iii), said heated water stream temperature is at least about 5° C. higher than said source water first temperature.

27. The method of claim 1, wherein the membrane is isotropic.

* * * * *